(12) United States Patent
Barrick

(10) Patent No.: US 11,793,098 B2
(45) Date of Patent: Oct. 24, 2023

(54) SYSTEM AND METHOD FOR DETECTING LEVELNESS OF TOOLS OF A TILLAGE IMPLEMENT BASED ON MATERIAL FLOW

(71) Applicant: CNH Industrial America LLC, New Holland, PA (US)

(72) Inventor: Christopher Barrick, Morton, IL (US)

(73) Assignee: CNH Industrial America LLC, New Holland, PA (US)

( * ) Notice: Subject to any disclaimer, the term of this patent is extended or adjusted under 35 U.S.C. 154(b) by 1049 days.

(21) Appl. No.: 16/551,900

(22) Filed: Aug. 27, 2019

(65) Prior Publication Data

US 2021/0059094 A1 Mar. 4, 2021

(51) Int. Cl.
*A01B 63/111* (2006.01)
*A01B 63/00* (2006.01)
*A01B 79/00* (2006.01)

(52) U.S. Cl.
CPC ........ *A01B 63/1112* (2013.01); *A01B 63/008* (2013.01); *A01B 79/005* (2013.01)

(58) Field of Classification Search
CPC combination set(s) only.
See application file for complete search history.

(56) References Cited

U.S. PATENT DOCUMENTS

| 7,748,147 | B2 * | 7/2010 | Schoenmaker | ......... | E02F 3/437 |
| | | | | | 701/50 |
| 7,752,779 | B2 * | 7/2010 | Schoenmaker | ......... | E02F 3/439 |
| | | | | | 701/50 |
| 7,894,962 | B2 * | 2/2011 | Sahlin | ..................... | E02F 3/847 |
| | | | | | 701/50 |
| 8,827,001 | B2 | 9/2014 | Wendte et al. | | |

(Continued)

FOREIGN PATENT DOCUMENTS

| CN | 201812174 | 4/2011 |
| EP | 0241748 A2 | 10/1987 |

(Continued)

OTHER PUBLICATIONS

The International Search Report and Written Opinion Corresponding to Application No. PCT/US2020/047778 dated Nov. 30, 2020 (15 pages).

*Primary Examiner* — Jean Paul Cass
(74) *Attorney, Agent, or Firm* — Rebecca Henkel; Rickard Demille

(57) ABSTRACT

A system for detecting the levelness of ground engaging tools of a tillage implement including an agricultural implement including a frame and ground engaging tools supported relative to the frame. The system includes a first sensor and a second sensor configured to capture data indicative of a material flow past one or more first ground engaging tools and second ground engaging tools, respectively. The system includes a controller configured to monitor data received from the first sensor and the second sensor and compare one or more first monitored values and one or more second monitored values associated with the material flow past the first ground engaging tool(s) and the second ground engaging tool(s), respectively. The controller is further configured to identify that at least a portion of the ground engaging tools are not level when the first monitored value(s) differs from the second monitored value(s) by a predetermined threshold value.

22 Claims, 8 Drawing Sheets

(56) References Cited

U.S. PATENT DOCUMENTS

| | | |
|---|---|---|
| 8,862,339 B2 | 10/2014 | Henry et al. |
| 9,282,688 B2 | 3/2016 | Casper et al. |
| 9,405,039 B2 | 8/2016 | Anderson |
| 9,485,900 B2 | 11/2016 | Connell et al. |
| 9,578,808 B2 * | 2/2017 | Dybro .................. A01D 75/00 |
| 9,668,399 B2 | 6/2017 | Gates |
| 10,070,574 B2 | 9/2018 | Wileniec et al. |
| 10,123,475 B2 | 11/2018 | Posselius et al. |
| 10,939,604 B2 * | 3/2021 | Sporrer ............... A01B 63/1115 |
| 11,091,026 B2 * | 8/2021 | Mussack ............... B60K 11/06 |
| 11,214,939 B2 * | 1/2022 | Remmelmann ......... E02F 3/422 |
| 2015/0305224 A1 | 10/2015 | Casper et al. |
| 2016/0029547 A1 | 2/2016 | Casper et al. |
| 2017/0094889 A1 | 4/2017 | Garner et al. |
| 2017/0112043 A1 | 4/2017 | Nair et al. |
| 2018/0206393 A1 | 7/2018 | Stoller et al. |
| 2018/0271016 A1 * | 9/2018 | Milano .................. A01D 33/14 |
| 2018/0336410 A1 | 11/2018 | Posselius |
| 2018/0340845 A1 | 11/2018 | Rhodes et al. |
| 2018/0352718 A1 | 12/2018 | Kovach et al. |
| 2020/0060062 A1 | 2/2020 | Sporrer et al. |
| 2020/0260633 A1 * | 8/2020 | Kovach .................. A01B 71/02 |
| 2020/0260634 A1 * | 8/2020 | Kovach ................ A01B 49/027 |
| 2020/0390023 A1 * | 12/2020 | Harmon ................ A01B 71/02 |
| 2021/0059094 A1 * | 3/2021 | Barrick ................ A01B 79/005 |
| 2021/0100155 A1 * | 4/2021 | Vandeven ............. A01B 63/111 |
| 2021/0102856 A1 * | 4/2021 | Glovier ................. A01B 61/042 |
| 2021/0102984 A1 * | 4/2021 | Stanhope ............. A01B 61/042 |
| 2021/0105925 A1 * | 4/2021 | Blunier .................. A01B 9/003 |
| 2021/0108951 A1 * | 4/2021 | Smith .................... A01B 25/00 |
| 2021/0120726 A1 * | 4/2021 | Barrick .................... A01B 5/00 |
| 2021/0123728 A1 * | 4/2021 | Smith .................... A01B 63/24 |
| 2021/0190754 A1 * | 6/2021 | Stoller ..................... A01C 7/08 |

FOREIGN PATENT DOCUMENTS

| | | |
|---|---|---|
| WO | WO 2015/112085 | 7/2015 |
| WO | WO 2018200870 | 11/2018 |

* cited by examiner

SYSTEM AND METHOD FOR DETECTING LEVELNESS OF TOOLS OF A TILLAGE IMPLEMENT BASED ON MATERIAL FLOW

FIELD OF THE INVENTION

The present disclosure generally relates to tillage implements and, more particularly, to systems and methods for detecting the levelness of ground engaging tools of a tillage implement based on the difference in material flow past the ground engaging tools.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. Tillage implements typically include a plurality of ground engaging tools configured to penetrate the soil to a particular depth. In this respect, the ground engaging tools may be pivotally coupled to a frame of the tillage implement. Tillage implements may also include biasing elements, such as springs, configured to exert biasing forces on the ground engaging tools. This configuration may allow the ground engaging tools to maintain the particular depth of soil penetration as the agricultural work vehicle pulls the tillage implement through the field. Additionally, this configuration may also permit the ground engaging tools to pivot out of the way of rocks or other impediments in the soil, thereby preventing damage to the ground engaging tools or other components on the implement.

However, in certain situations, the ground engaging tools may not penetrate the soil to the same depth due to, for instance, height variation within the field. As an example, the ground engaging tools at one side of the implement may penetrate the soil to a greater degree than the ground engaging tools at the opposite side of the implement. As such, the ground engaging tools of the implement may not be level in relation to the soil to be cultivated. An unlevel implement may be associated with several disadvantages to the cultivation process and/or the tillage implement itself. Generally, the soil may be penetrated deeper than desired on one side of the implement and may not penetrate deep enough on the opposite of the implement. Thus, the unlevel implement may lead to locations of the field that are not cultivated to a sufficient degree, requiring the soil to be cultivated again at those locations. Further, the ground engaging tools that penetrate the soil to a greater degree may suffer from increased wear and require earlier replacement compared to ground engaging tools that penetrate to a lesser degree. Further, deeper penetrating ground engaging tools may impact deeper impediments in the soil that may damage the ground engaging tools.

Generally, an operator of the tillage implement may roughly estimate the levelness of the implement or ground engaging tools by visually inspecting the amount of soil or crop residue displaced or thrown up by the ground engaging tools, such as discs of the tillage implement. However, tillage implements are typically pulled behind the work vehicle. Thus, the operator must turn around to inspect such displaced soil and/or crop residue while the work vehicle is moving forward. Such a procedure has several disadvantages. The operator must look away from the path of the work vehicle, which may increase the risks of accidents or unintentional deviations from the desired path of the tillage implement. Further, such visual inspection may not allow the operator to determine the levelness of the ground engaging tools or implement as accurately as desired or required Accordingly, an improved system and method for detecting the levelness ground engaging tools of a tillage implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for detecting the levelness of ground engaging tools of a tillage implement. The system includes an agricultural implement including a frame and two or more ground engaging tools supported relative to the frame. The system further includes a first sensor coupled to the frame and configured to capture data indicative of a material flow past one or more first ground engaging tools. The system further also includes a second sensor coupled to the frame and configured to capture data indicative of a material flow past one or more second ground engaging tools. Additionally, the system includes a controller configured to monitor data received from the first sensor and the second sensor and compare one or more first monitored values associated with the material flow past the first ground engaging tool(s) to one or more second monitored values associated with the material flow past the second ground engaging tool(s). The controller is further configured to identify that at least a portion of the ground engaging tools are not level when the first monitored value(s) differs from the second monitored value(s) by a predetermined threshold value.

In another aspect, the present subject matter is directed to a method for detecting the levelness of ground engaging tools of a tillage implement. The implement includes an implement frame and two or more ground engaging tools coupled to the frame. The method includes controlling, with a computing device, an operation of the tillage implement as the implement is being moved across the field. The method further includes monitoring, with the computing device, a material flow past one or more first ground engaging tools based on data received from a sensor associated with the first ground engaging tool(s). The method additionally includes monitoring, with the computing device, a material flow past one or more second ground engaging tools based on data received from a sensor associated with the second ground engaging tool(s). Further, the method includes comparing one or more first monitored values associated with the material flow past the first ground engaging tool(s) to one or more second monitored values associated with the material flow past the second ground engaging tool(s). Additionally, the method includes identifying that at least a portion of the ground engaging tools are not level when the first monitored value(s) differs from the second monitored value(s) by a predetermined threshold value for a predetermined length of time.

In further aspect, the present subject matter is directed to a tillage system. The tillage system includes a work vehicle configured to move across a field. The tillage system further includes an agricultural implement including a frame and two or more ground engaging tools supported relative to the frame. The tillage system further includes a system for detecting the levelness of at least a portion of the ground engaging tools. The system includes one or more sensors coupled to one or more of the frame or the work vehicle. The sensor(s) is configured to capture data indicative of a material flow past one or more first ground engaging tools and one or more second ground engaging tools. The system further includes a controller configured to monitor data received from the sensor(s) and compare one or more first monitored values associated with the material flow past the first ground engaging tool(s) to at one or more second monitored values associated with the material flow past the second ground engaging tool(s). Further, the controller is configured to identify that the at least a portion of the ground engaging tools are not level when the first monitored value (s) differs from the second monitored value(s) by a predetermined threshold value.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
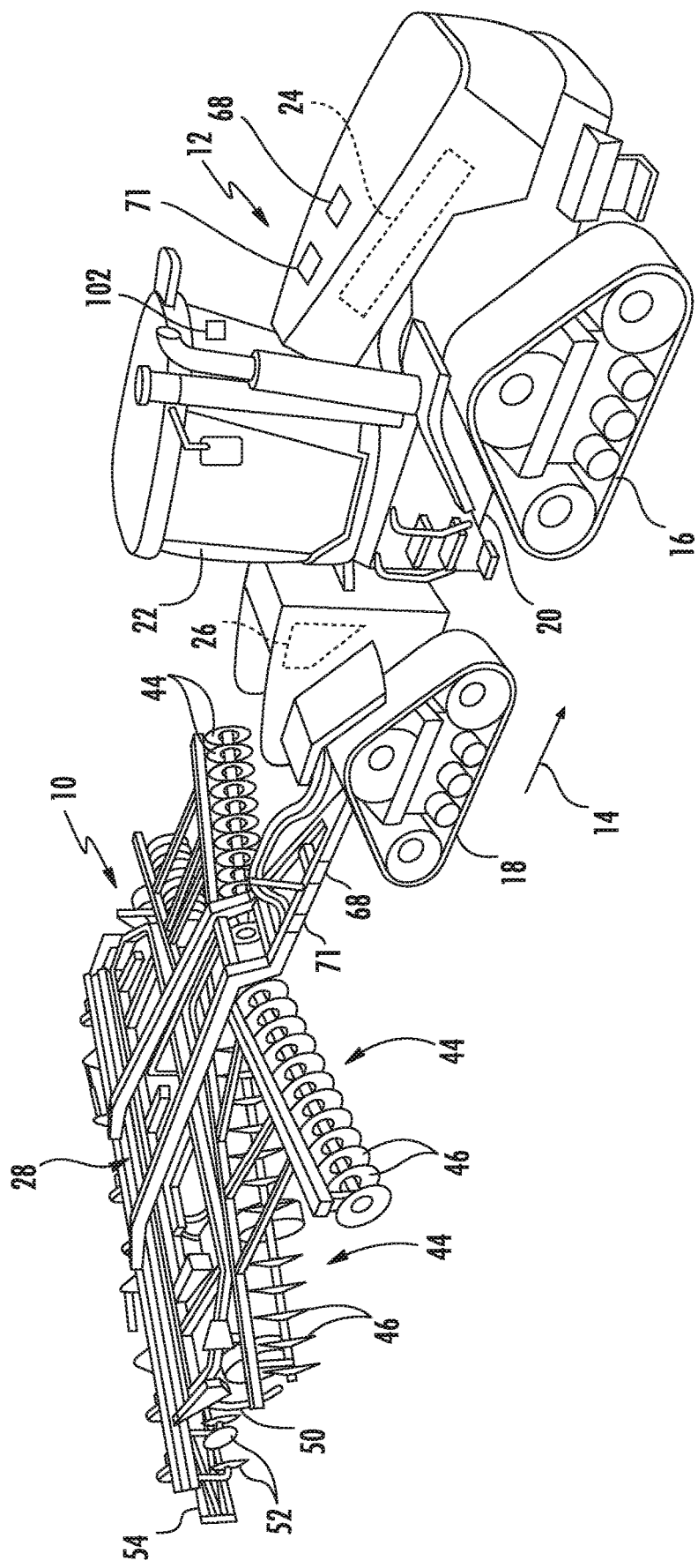
FIG. 1 illustrates a perspective view of one embodiment of a tillage implement in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for detecting the levelness of ground engaging tools of a tillage implement. Specifically, in several embodiments, a controller of the disclosed system may be configured to receive data indicative of a material flow past ground engaging tools of the implement, such as disc blades supported by disc gang assemblies. The difference in the material flow past the ground engaging tool(s) at separate location of the tillage implement may, in turn, be indicative of the levelness of at least a portion of the ground engaging tools. For instance, the controller may be configured to monitor the data received from one or more contact and/or non-contact sensors associated with the ground engaging tool(s) of separate tool assemblies and compare a difference in the monitored values to a predetermined threshold value set for the ground engaging tool(s). For example, the ground engaging tool(s) may be one or more disc blades attached to hangers of disc gang assemblies. In such a circumstance, the sensors may be coupled to the toolbars the disc gang assemblies, the frame of the implement, and/or a work vehicle to communicate data indicative of the material flow past the disc blade(s).

In several embodiments, the difference in the material flow past the ground engaging tools may be indicative of the levelness of at least a portion of the ground engaging tools. Specifically, a difference between material flow past the ground engaging tool(s) of separate tool assemblies greater than a predetermined threshold value over a predetermined length of time may indicate at least a portion of the ground engaging tools are not level. As such, the controller may be configured to identify that at least a portion of the ground engaging tools are not level when the difference in monitored material flows is greater than the predetermined threshold value. The identification of unlevel ground engaging tools may allow for the operator to take corrective action. Alternatively, the controller may be configured to automatically execute a corrective action adapted to level the ground engaging tools.

Figure 2:
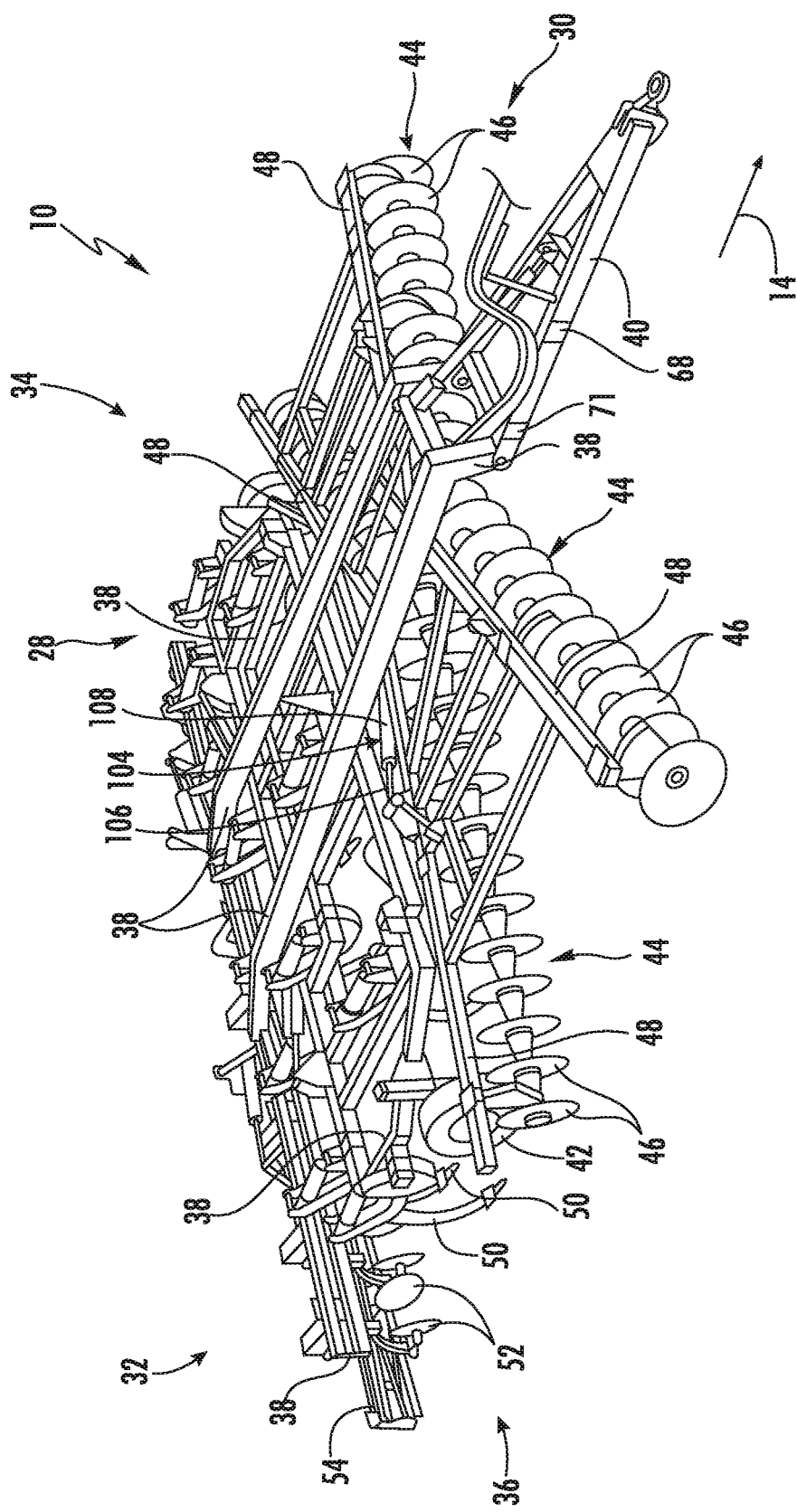
FIG. 2 illustrates an alternative perspective view of the tillage implement in accordance with aspects of the present subject matter, particularly illustrating various components of the implement.

Referring now to the drawings, FIGS. 1 and 2 illustrate differing perspective views of one embodiment of an agricultural implement 10 in accordance with aspects of the present subject matter. Specifically, FIG. 1 illustrates a perspective view of the agricultural implement 10 coupled to a work vehicle 12. Additionally, FIG. 2 illustrates a perspective view of the implement 10, particularly illustrating various components of the implement 10.

In general, the implement 10 may be configured to be towed across a field in a direction of travel (e.g., as indicated by arrow 14 in FIG. 1) by the work vehicle 12. As shown, the implement 10 may be configured as a tillage implement, and the work vehicle 12 may be configured as an agricultural tractor. However, in other embodiments, the implement 10 may be configured as any other suitable type of implement, such as a seed-planting implement, a fertilizer-dispensing implement, and/or the like. Similarly, the work vehicle 12 may be configured as any other suitable type of vehicle, such as an agricultural harvester, a self-propelled sprayer, and/or the like.

As shown in FIG. 1, the work vehicle 12 may include a pair of front track assemblies 16, a pair or rear track assemblies 18, and a frame or chassis 20 coupled to and supported by the track assemblies 16, 18. An operator's cab 22 may be supported by a portion of the chassis 20 and may house various input devices (e.g., a user interface 102) for permitting an operator to control the operation of one or more components of the work vehicle 12 and/or one or more components of the implement 10. Additionally, as is generally understood, the work vehicle 12 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

As shown in FIGS. 1 and 2, the implement 10 may include a frame 28. More specifically, the frame 28 may extend longitudinally between a forward end 30 and an aft end 32. The frame 28 may also extend laterally between a first side 34 and a second side 36. In this respect, the frame 28 generally includes a plurality of structural frame members 38, such as beams, bars, and/or the like, configured to support or couple to a plurality of components. Furthermore, a hitch assembly 40 may be connected to the frame 28 and configured to couple the implement 10 to the work vehicle 12. Additionally, a plurality of wheels 42 (one is shown in FIG. 2) may be coupled to the frame 28 to facilitate towing the implement 10 in the direction of travel 14. As further illustrated, at least one of work vehicle 12 or the implement 10 may include a sensor 71 configured to provide data indicative of a speed of the agricultural implement 10 as the agricultural implement 10 is moved across the field, such as a ground speed sensor providing data indicative of the ground speed of the implement 10 and/or the work vehicle 12. As shown particularly in FIG. 1, at least one of work vehicle 12 or the implement 10 may include a sensor 68 configured to provide data indicative of a location of the agricultural implement 10 as the agricultural implement 10 is moved across the field, such as a global positioning system (GPS) sensor providing data indicative of the location of the agricultural implement 10 and/or the work vehicle 12.

In several embodiments, one or more ground engaging tools may be coupled to and/or supported by the frame 28. In such embodiments, the ground engaging tool(s) may, for example, include one or more ground-penetrating tools. More particularly, in certain embodiments, the ground engaging tools may include one or more shanks 50 and/or disc blades 46 supported relative to the frame 28. In one embodiment, each shank 50 and/or disc blade 46 may be individually supported relative to the frame 28. Alternatively, one or more groups or sections of the ground engaging tools may be ganged together to form one or more ganged tool assemblies, such as the disc gang assemblies 44 shown in FIGS. 1 and 2.

As illustrated in FIG. 2, each disc gang assembly 44 includes a toolbar 48 coupled to the implement frame 28 and a plurality of disc blades 46 supported by the toolbar 48 relative to the implement frame 28. Each disc blade 46 may, in turn, be configured to penetrate into or otherwise engage the soil as the implement 10 is being pulled through the field. As is generally understood, the various disc gang assemblies 44 may be oriented at an angle relative to the direction of travel 14 to promote more effective tilling of the soil. In the embodiment shown in FIGS. 1 and 2, the implement 10 includes four disc gang assemblies 44 supported on the frame 28 at a location forward of the shanks 50, such as by including two forward disc gang assemblies 44 and two rear disc gang assemblies 44 positioned adjacent to the forward end 30 of the implement 10. However, it should be appreciated that, in alternative embodiments, the implement 10 may include any other suitable number of disc gang assemblies 44, such as more or fewer than four disc gang assemblies 44. Furthermore, in one embodiment, the disc gang assemblies 44 may be mounted to the frame 28 at any other suitable location, such as adjacent to its aft end 32.

Moreover, in several embodiments, the implement 10 may include a plurality of disc gang actuators 104 (one is shown in FIG. 2), with each actuator 104 being configured to move or otherwise adjust the orientation or position of one of the disc gang assemblies 44 relative to the implement frame 28. For example, as shown in FIG. 2, a first end of each actuator 104 (e.g., a rod 106 of the actuator 104) may be coupled to a toolbar 48 of the corresponding disc gang assembly 44, while a second end of each actuator 104 (e.g., the cylinder 108 of the actuator 104) may be coupled to the frame 28. The rod 106 of each actuator 104 may be configured to extend and/or retract relative to the corresponding cylinder 108 to adjust the angle of the corresponding disc gang assembly 44 relative to a lateral centerline (not shown) of the frame 28 and/or the penetration depth of the associated disc blades 46. Furthermore, the rod 106 of each actuator 104 may be configured to extend and/or retract relative to the corresponding cylinder 108 to adjust a downforce applied by the actuator(s) 104 to the disk gang assembly 44, and thus the disc blades 46. In the illustrated embodiment, each actuator 104 corresponds to a fluid-driven actuator, such as a hydraulic or pneumatic cylinder. However, it should be appreciated that each actuator 104 may correspond to any other suitable type of actuator, such as an electric linear actuator.

It should be appreciated that, in addition to the shanks 50 and the disc blades 46, the implement frame 28 may be configured to support any other suitable ground engaging tools. For instance, in the illustrated embodiment, the frame 28 is also configured to support a plurality of leveling blades 52 and rolling (or crumbler) basket assemblies 54. In other embodiments, any other suitable ground engaging tools may be coupled to and supported by the implement frame 28, such as a plurality closing discs.

It should be appreciated that the configuration of the implement 10 described above and shown in FIGS. 1 and 2 is provided only to place the present subject matter in an exemplary field of use. Thus, it should be appreciated that the present subject matter may be readily adaptable to any manner of implement configuration.

Figure 3:
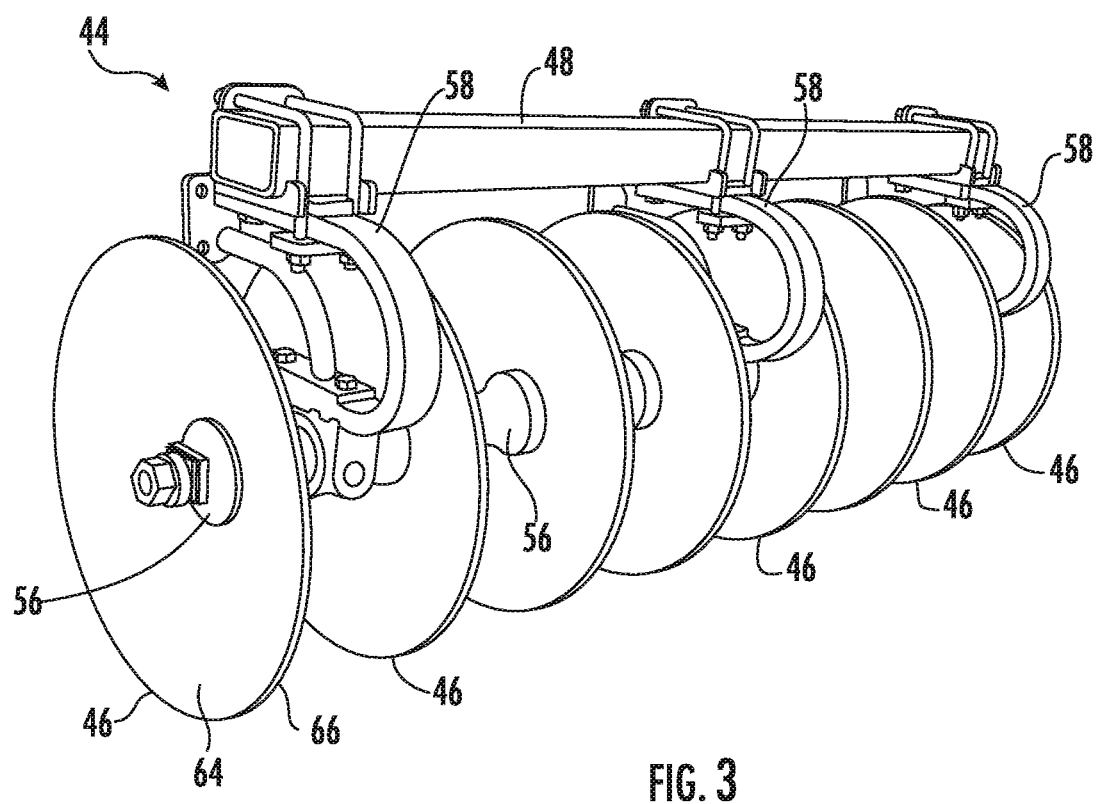
FIG. 3 illustrates a perspective view of a ganged tool assembly of the implement in accordance with aspects of the present subject matter, particularly illustrating the ganged tool assembly configured as a disc gang assembly of the tillage implement.

Referring now to FIG. 3, one example implementation of a ganged tool assembly described above in reference to FIGS. 1 and 2 is illustrated in accordance with aspects of the present subject matter. Specifically, FIG. 3 illustrates a perspective view of various components of the disc gang assemblies 44 of the implement 10 described above with reference to FIGS. 1 and 2. However, it should be appreciated that the aspects of ganged tool assembly described herein with reference to FIG. 3 may also be utilized with any other ganged tool assembly including any other suitable ground engaging tools of a given agricultural implement 10.

As shown in FIG. 3, the disc gang assembly 44 may include a plurality of disc blades 46 rotatably coupled to and spaced apart along the length of a disc gang shaft 56. The disc gang shaft 56 may, in turn, be positioned underneath and coupled to the toolbar 48 of the disc gang assembly 44 via one or more hangers 58 of the disc gang assembly 44. For example, in the illustrated embodiment, the hangers 58 define a C-shape that permits the disc gang shaft 56 and the disc blades 46 mounted thereon to move relative to the toolbar 48. However, it should be appreciated that, in alternative embodiments, the hanger(s) 58 may have any other suitable configuration.

Each of the disc blades 46 may include a concave side 64 and a convex or flat side (convex side 66) opposite the concave side 64. The concave side 64 may generally be configured to penetrate and lift or throw the soil of the field. The convex side 66 is generally configured to reduce a back pressure or force on the convex side 66 of the disc blade 46. Generally the disc gang assembly 44 includes disc blades 46 with concave sides 64 oriented in the same direction such that the lifted soil is thrown in the same direction. For example, as also shown in FIG. 2, the disc blades 46 of the disc gang assembly 44 at the forward end 30 and first side 34 of the implement 10 may each generally lift and throw the soil outward towards the first side 34. Similarly, the disc blades 46 of the disc gang assembly 44 at the forward end 30 and second side 36 of the implement 10 may each generally lift and throw the soil outward towards the second side 36.

It is generally desirable that the disc blades 46 of the disc gang assemblies 44 at the aft end 32 of the implement be arranged to lift and throw the soil in the opposite direction than the disc gang assemblies 44 at the forward end 30. For instance, the disc blades 46 of the disc gang assembly 44 at the aft end 32 and first side 34 of the implement 10 may each generally lift and throw the soil inward towards the second side 36. Similarly, the disc blades 46 of the disc gang assembly 44 at the aft end 32 and second side 36 of the implement 10 may each generally lift and throw the soil inward towards the first side 34. Such an arrangement may generally avoid or reduce vallies and mounds formed behind the implement 10 as implement 10 is towed across the field. Moreover, the amount of soil thrown by the disc blades 46 may generally be modified by altering a depth of penetration of the disc blades 46. It should be appreciated that other configuration of the disc blades 46 may be suitable and equally applicable to the present disclosure. For instance, the disc blades 46 at the forward end 30 of the implement 10 may lift and throw the soil inward while the disc blades 46 at the aft end 32 may lift and throw the soil back outward.

Figure 4:
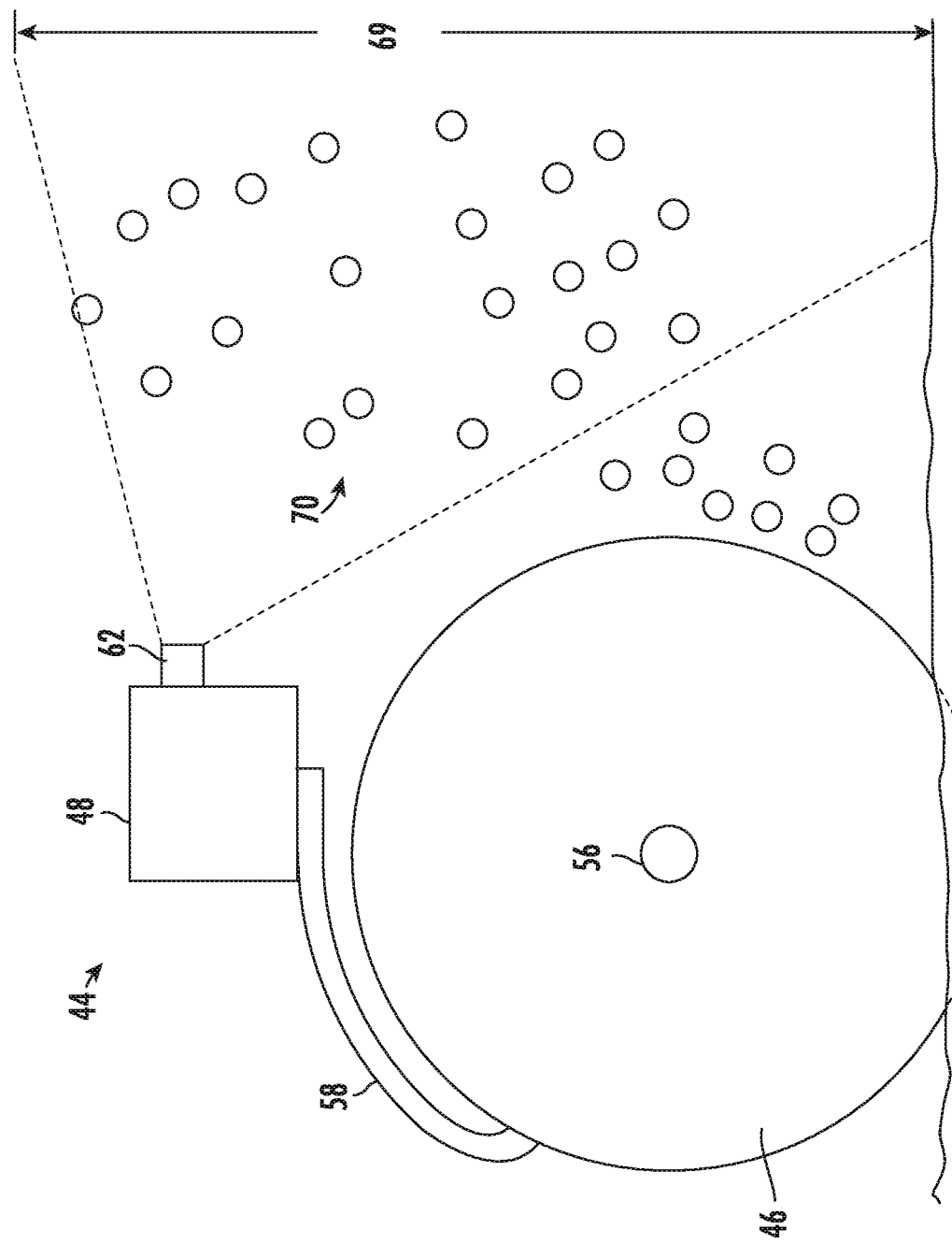
FIG. 4 illustrates a schematic side view of an exemplary disc gang assembly in accordance with aspects of the present subject matter, particularly illustrating a non-contact sensor associated with the disc gang assembly.

Referring now to FIG. 4, an exemplary embodiment of a ganged tool assembly described above in reference to FIGS. 1-3 is illustrated schematically in accordance with aspects of the present subject matter. Particularly, FIG. 4 illustrates a non-contact sensor 62 associated with the disc gang assembly 44. However, it should be appreciated that the aspects of ganged tool assembly described herein with reference to FIG. 4 may also be utilized with any other ganged tool assembly including any other suitable ground engaging tools of a given agricultural implement 10. Furthermore, FIG. 4 illustrated a ganged tool assembly, but it should be recognized that following disclosure is generally applicable to a tool assembly including a single ground engaging tool coupled to the frame 28 of the agricultural implement 10. For example, in certain situations, a single ground engaging tool or multiple ground engaging tools may be coupled to the toolbar 48 utilizing individual hangers 58 associated with each ground engaging tool. As another example, individual ground engaging tools, such as shanks 50, may be coupled directly to one or more of the structural frame members 38.

Figure 7:
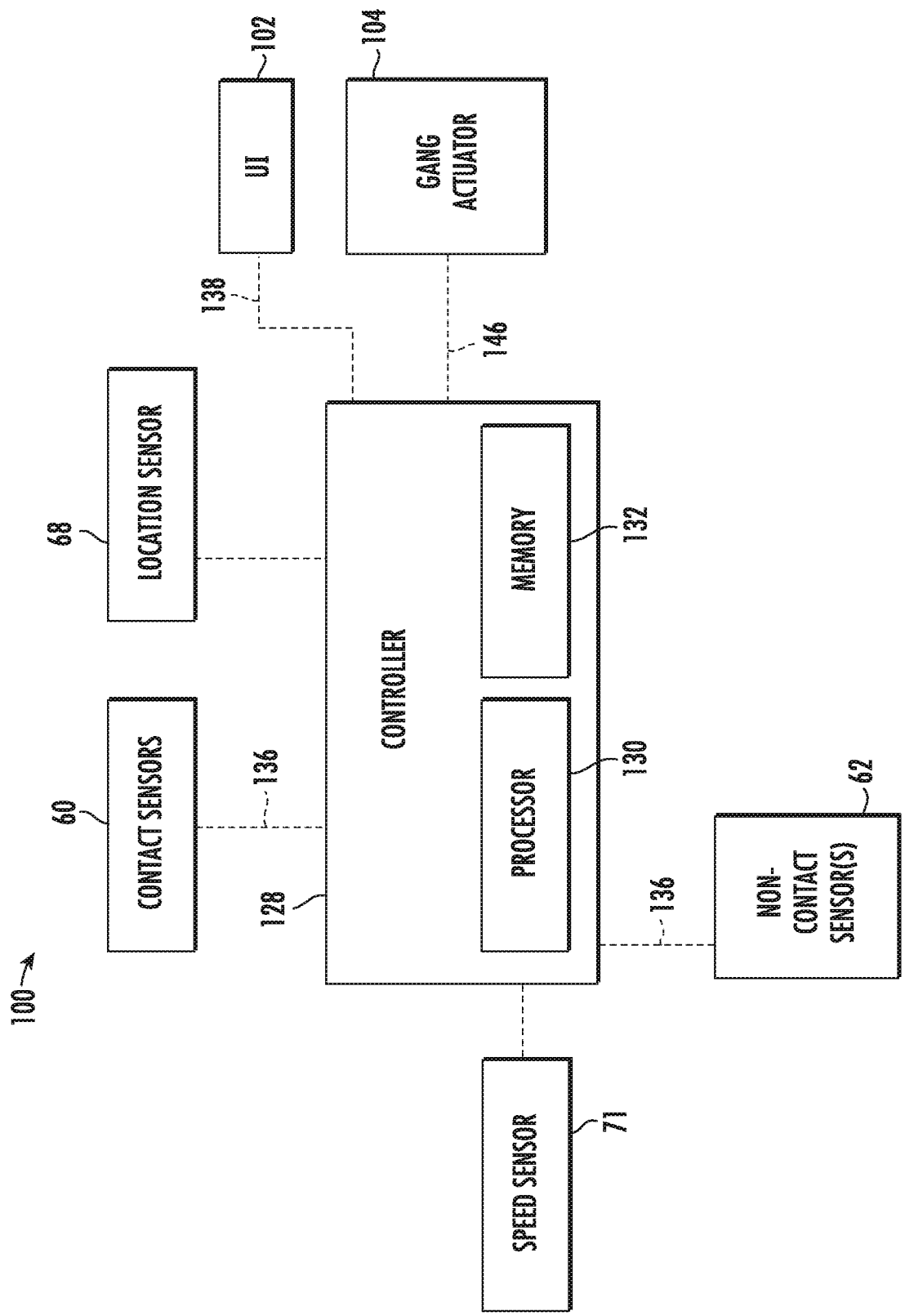
FIG. 7 illustrates a schematic view of one embodiment of a system for detecting the levelness of ground engaging tools of the tillage implement in accordance with aspects of the present subject matter.

Additionally, in accordance with aspects of the present subject matter, the disc gang assembly 44 may include one or more non-contact sensors 62 configured to detect a material flow past one or more of the disc blades 46. For example, the non-contact sensor(s) 62 may be arranged to detect the material flow between two disc blades 46 of the disc gang assembly 44 or the material flow between multiple disc blades 46 of the disc gang assembly 44. For instance, the non-contact sensor(s) 62 may be configured to detect a height 69 or a density of soil lifted by the disc blade(s) 46 (lifted soil 70) by one or more of the disc blades 46 as the implement 10 is being moved across the field and transmit associated material flow data to a corresponding system controller 128 (such as via one or more communicative links 136 as shown in FIG. 7). For instance, a greater material flow past the disc blade(s) 46 may cause a greater amount of lifted soil 70 and higher density of the lifted soil 70 and/or may throw the lifted soil 70 to a greater height 69 as compared to a lesser material flow past the disc blade(s) 46. In one embodiment, the non-sensor(s) 62 may correspond to one or more cameras, optical sensors. RADAR sensors, ultrasonic transceiver (either as single unit or separate ultrasonic transmitter(s) and receiver(s)), or motion detector associated with the disc gang assembly 44 and configured to detect the material flow past one or more of the disc blades 46 of the disc gang assembly 44 as the disc blades 46 are being pulled through the ground.

As shown in FIG. 4, the non-contact sensor(s) 62 may, in one embodiment, be mounted directly to a component(s) of the disc gang assembly 44. For instance, in the illustrated embodiment, the non-contact sensor(s) 62 is mounted directly to the toolbar 48 in order to detect the material flow past the disc blade(s) 46. In additional embodiments, the non-contact sensor(s) 62 may be mounted on a hanger 58 coupled between the toolbar 48 and the disc blades 46. It should be further appreciated that the non-contact sensor(s) 62 may be arranged between various components of the disc gang assembly 44, such as between the hanger 58 and the toolbar 48 or between the toolbar 48 and the frame 28. Further, the non-contact sensor(s) 62 may be coupled to frame 28 (e.g., to a structural frame member 38) and oriented to detect the material flow past the disc blade(s) 46. As described in more detail in reference to FIG. 6, the non-contact sensor(s) 62 may further be coupled to the work vehicle 12 and oriented to detect the material flow past the disc blade(s) 46 of one or more of the disc gang assemblies 44.

Figure 6:
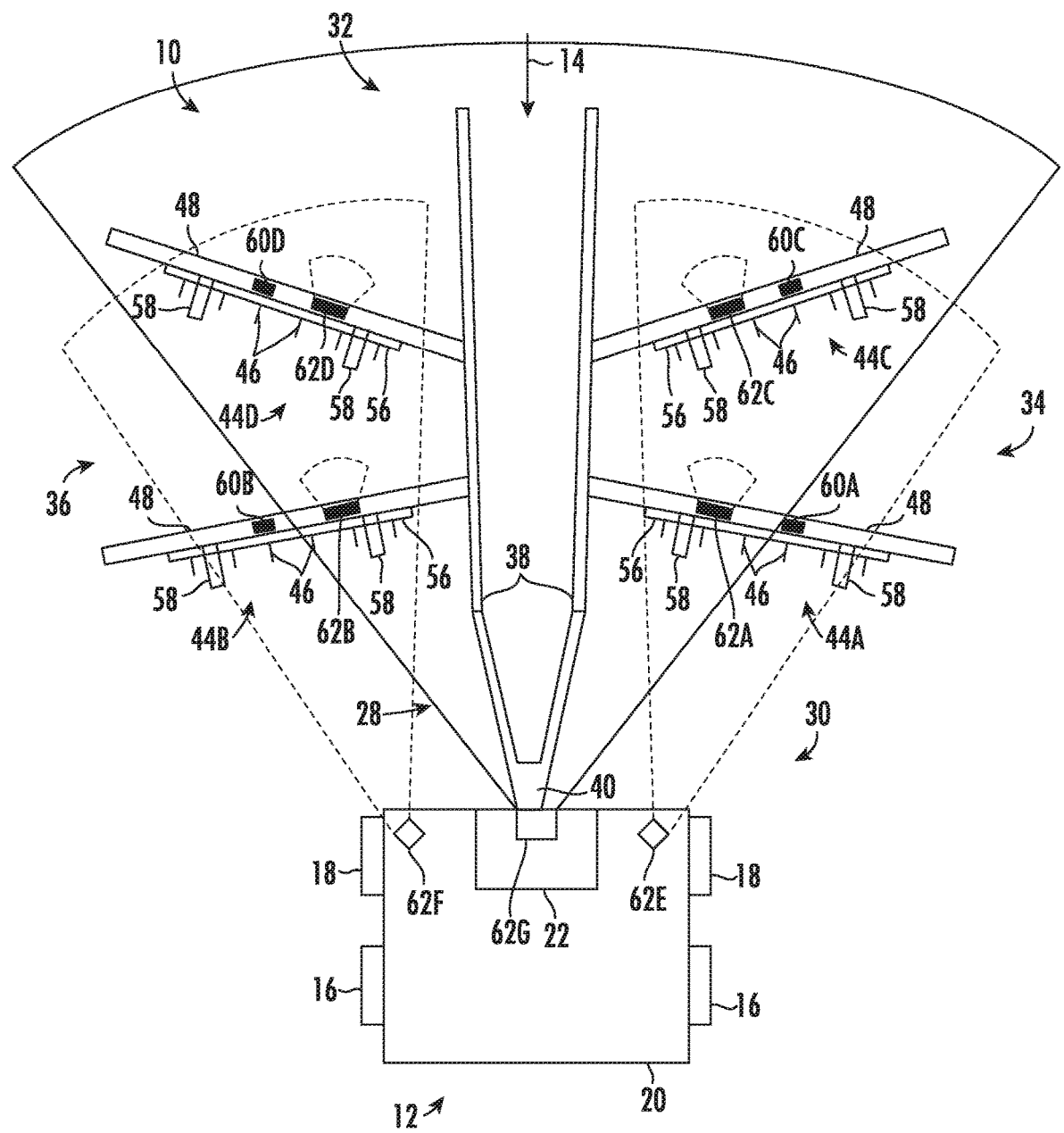
FIG. 6 illustrates an exemplary top schematic view of the disc gang assemblies of the implement and a work vehicle in accordance with aspects of the present subject matter, particularly illustrating four disc gang assemblies and associated non-contact and contact sensors.

It should be appreciated that FIGS. 4 and 6 provide examples of various different locations for mounting non-contact sensor(s) 62 associated with a disc gang assembly 44. It should be appreciated that, in alternative embodiments, the non-contact sensor(s) 62 may be configured as any other suitable device for sensing or detecting a parameter indicative of the material flow past the disc blade(s) 46 of one or more of the disc gang assembly 44, such as all the disc gang assemblies 44. It should be appreciated that although the non-contact sensor(s) 62 has been described in the context of a ganged tool assembly, one or more non-contact sensor(s) 62 may, for example, be provided in operative association with the ground engaging tool(s) of each ganged tool assembly to allow the material flow past the respective ground engaging tool(s) to be monitored. Still further, one or more non-contact sensor(s) 62 may be provided, for example, in operative association with the ground engaging tool of a tool assembly or individual ground engaging tools coupled to the frame 28 to allow the material flow past the associated the ground engaging tool(s) to be monitored.

Figure 5:
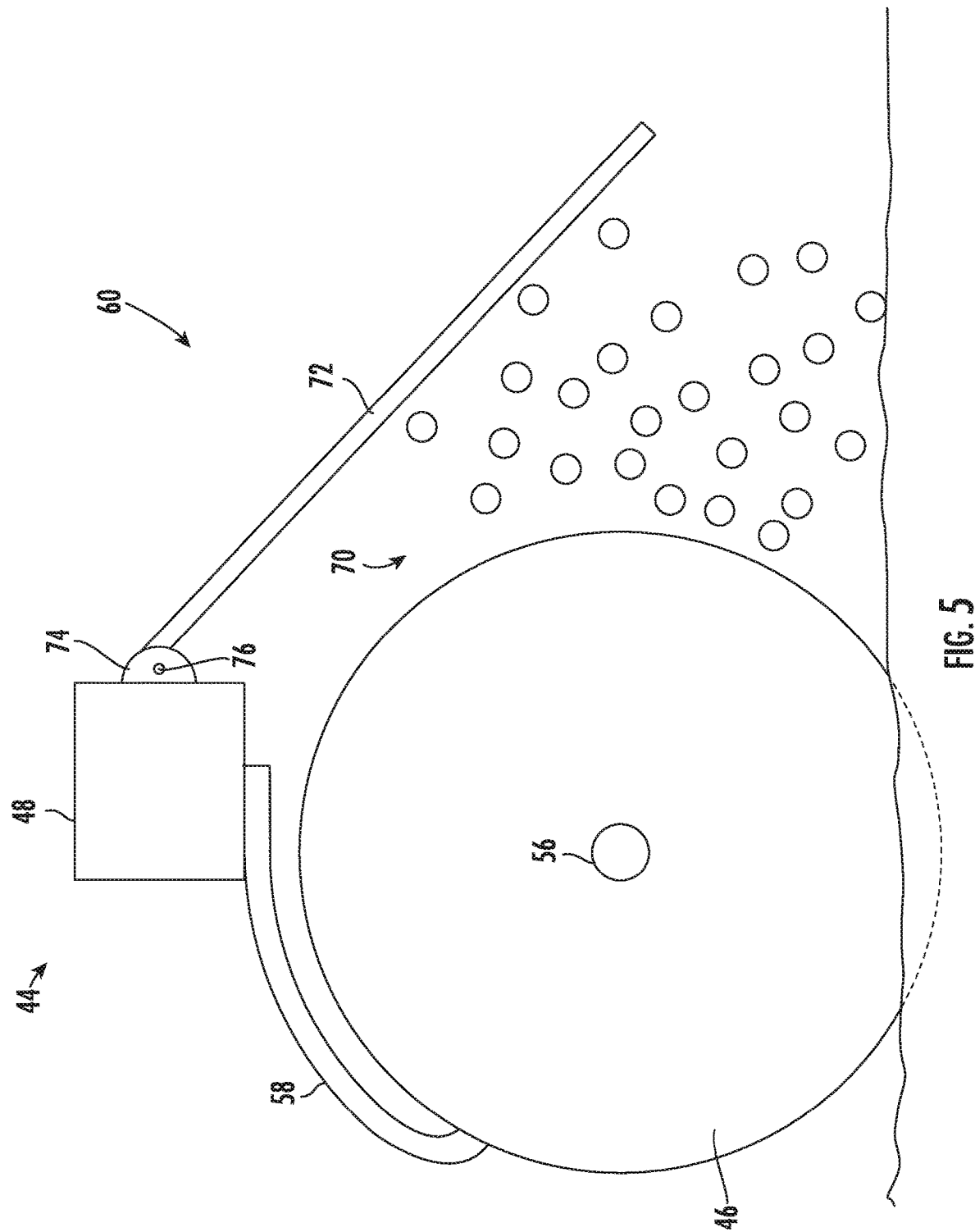
FIG. 5 illustrates a schematic side view of another exemplary disc gang assembly in accordance with aspects of the present subject matter, particularly illustrating a contact sensor associated with the disc gang assembly.

Referring now to FIG. 5, another exemplary embodiment of a ganged tool assembly described above in reference to FIGS. 1-3 is illustrated schematically in accordance with aspects of the present subject matter. Particularly, FIG. 4 illustrates a contact sensor 60 associated with the disc gang assembly 44. However, it should be appreciated that the aspects of ganged tool assembly described herein with reference to FIG. 5 may also be utilized with any other ganged tool assembly including any other suitable ground engaging tools of a given agricultural implement 10. Furthermore, FIG. 5 illustrated a ganged tool assembly, but it should be recognized that following disclosure is generally applicable to a tool assembly including a single ground engaging tool coupled to the frame 28 of the agricultural implement 10. For example, in certain situations, a single ground engaging tool or multiple ground engaging tools may be coupled to the toolbar 48 utilizing individual hangers 58 associated with each ground engaging tool. As another example, individual ground engaging tools, such as shanks 50, may be coupled directly to one or more of the structural frame members 38.

Additionally, in accordance with aspects of the present subject matter, the disc gang assembly 44 may include one or more contact sensors 60 configured to detect a material flow past one or more of the disc blades 46. For example, the contact sensor(s) 60 may be arranged to detect the material flow between two disc blades 46 of the disc gang assembly 44 or the material flow between multiple disc blades 46 of the disc gang assembly 44. For instance, the contact sensors 60 may be configured to detect a density of the lifted soil 70 by one or more of the disc blades 46 as the implement 10 is being moved across the field and transmit associated load data to a corresponding system controller 128 (such as via one or more communicative links 136 as shown in FIG. 7). In the exemplary embodiment of FIG. 5, the contact sensor 60 may include a deflection component 72 and a sensing component 74 at or adjacent to a rotational axis 76 of the deflection component 72.

In one exemplary embodiment, the sensing component 74 may include a load pin assembly, load cell, strain gauge, rotary sensor or the like configured to detect a force transmitted from the deflection component 72 to the toolbar 48. Generally, the deflection component 72 may be arranged such that lifted soil 70 impacts the deflection component 72 after being lifted and thrown by the disc blade(s) 46 and bounces off. Moreover, the impact of the lifted soil 70 on the deflection component 72 may impart a force on the deflection component 72. For instance, a greater material flow past the disc blade(s) 46 may cause a greater amount of lifted soil 70 and imparted force on the deflection component 72 as compared to a lesser material flow past the disc blade(s) 46. Such force may be detected by the sensing component 74 as the implement 10 is being moved across the field, and the sensing component 74 may transmit associated load data to a corresponding system controller 128 (such as via one or more communicative links 136 as shown in FIG. 7). Such load data detected by the sensing component 74 may be correlated to the material flow past the disc blade(s) 46. For instance, the controller 128 (FIG. 7) may be configured to determine the material flow, such as the density of the lifted soil 70, based on the one or more monitored values associated with the load acting on deflection component 72.

In another exemplary embodiment, the sensing component 74 may include rotary sensor such as rotary potentiometer or magnetic rotary sensor configured to detect an orientation of the deflection component 72 relative to the toolbar 48. In a further embodiment, the sensing component 74 may include a gyroscope, inertia motion unit, or the like configured to detect the orientation of the deflection component 72. Generally, the impact of the lifted soil 70 on the deflection component 72 may impart a force on the deflection component 72 and cause the deflection component 72 to rotate in relation to the toolbar 48. It should be appreciated that the contact sensor 60 may configured such that the force imparted by the lifted soil 70 causes such rotation in spite of the weight of the deflection component 72 and/or any contrary forces provided by biasing elements, not shown. For instance, a greater material flow past the disc blade(s) 46 may cause a greater amount of lifted soil 70 and a greater rotation of the deflection component 72 as compared to a lesser material flow past the disc blade(s) 46. Such rotation may be detected by the sensing component 74 as the implement 10 is being moved across the field, and the sensing component 74 may transmit associated rotation data to the corresponding system controller 128 (such as via the one or more communicative links 136 as shown in FIG. 7). Such rotation data detected by the sensing component 74 may be correlated to the material flow past the disc blade(s) 46. For instance, the controller 128 (FIG. 7) may be configured to determine the material flow, such as the density of the lifted soil 70, based on the one or more monitored values associated with the rotation of the deflection component 72.

As shown in FIG. 5, the contact sensor 60 may, in one embodiment, be mounted directly to a component(s) of the disc gang assembly 44. For instance, in the illustrated embodiment, the contact sensor(s) 60 is mounted directly to the toolbar 48 in order to detect the material flow past the disc blade(s) 46. In additional embodiments, the contact sensor(s) 60 may be mounted on a hanger 58 coupled between the toolbar 48 and the disc blades 46. It should be further appreciated that the contact sensor(s) 60 may be arranged between various components of the disc gang assembly 44, such as between the hanger 58 and the toolbar 48 or between the toolbar 48 and the frame 28. Further, the contact sensor(s) 60 may be coupled to frame 28 (e.g., to a structural frame member 38) and oriented to detect the material flow past the disc blade(s) 46.

It should be appreciated that FIGS. 5 and 6 provide examples of various different locations for mounting contact sensor(s) 60 associated with a disc gang assembly 44. It should be appreciated that, in alternative embodiments, the contact sensor(s) 60 may be configured as any other suitable device for sensing or detecting a parameter indicative of the material flow past the disc blade(s) 46 of one or more of the disc gang assembly 44, such as all the disc gang assemblies 44. It should be appreciated that although the contact sensor(s) 60 has been described in the context of a ganged tool assembly, one or more contact sensor(s) 60 may, for example, be provided in operative association with the ground engaging tool(s) of each ganged tool assembly to allow the material flow past the respective ground engaging tool(s) to be monitored. Still further, one or more contact sensor(s) 60 may be provided, for example, in operative association with the ground engaging tool of a tool assembly or individual ground engaging tools coupled to the frame 28 to allow the material flow past the associated the ground engaging tool(s) to be monitored.

Referring now to FIG. 6, an exemplary top schematic view of the disc assemblies 44 of the implement 10 is illustrated in accordance with aspects of the present subject matter. Specifically, FIG. 6 illustrates four disc gang assemblies 44 and associated contact sensors 60 and non-contact sensors 62. It should be appreciated that the other ground engaging tools, such as shanks 50, have been omitted for clarity. It should also be appreciated that aspects of the disc gang assemblies 44 described herein with reference to FIG. 6 may also be utilized with other ganged tool assemblies including any other suitable ground engaging tools of a given agricultural implement. Further, the description of FIG. 6 may generally be applicable to other tool assemblies including a ground engaging tool, such as shank 50 or disc blades 46, or individual ground engaging tools coupled to the frame 28 of the implement 10.

The implement 10 may include a first disc gang assembly 44A and/or a second disc gang assembly 44B positioned at or proximate to the forward end 30 of the implement 10 relative to the direction of travel 14. The first disc gang assembly 44A may positioned at or proximate to the first side 34 of the implement 10 relative to the direction of travel 14. Similarly, the second disc gang assembly 44B may be positioned at or proximate to the second side 36 of the implement 10. Further, the implement 10 may include a third disc gang assembly 44C and/or a fourth disc gang assembly 44D positioned at or proximate to the aft end 32 of the implement 10 relative to the direction of travel 14. The third disc gang assembly 44C may positioned at or proximate to the first side 34 of the implement 10 relative to the direction of travel 14. Similarly, the fourth disc gang assembly 44D may be positioned at or proximate to the second side 36 of the implement 10. Though four disc gang assemblies 44 are illustrated in FIG. 6, other embodiments may include more or less disc gang assemblies 44, and the description here may be equally applicable to implements with more or less disc gang assemblies 44, such as two disc gang assemblies 44.

As shown in FIG. 6, each disc gang assembly 44 may be provided one or more contact sensors 60 and/or non-contact sensors 62 in operative association with the gang disc assembly 44 in order to detect a parameter indicative of the material flow past the disc blade(s) 46 as generally as described regard to FIGS. 4 and 5. While the contact sensors 60 and non-contact sensors 62 are shown coupled to the toolbars 48 in FIG. 6, it should be appreciated that the contact sensors 60 and/or non-contact sensors 62 may be coupled to any part of the disc gang assemblies 44 and/or implement 10 suitable to detect a parameter indicative of the material flow past the disc blade(s) 46. Specifically, a first contact sensor 60A and/or a first non-contact sensor 62A may be provided in association with the first disc gang assembly 44A in order to capture data indicative of the material flow past the disc blade(s) 46 at the forward end 30 and first side 34 of the implement 10. A second contact sensor 60B and/or second non-contact sensor 62B may be provided in association with the second disc gang assembly 44B in order to capture data indicative of the material flow past the disc blade(s) 46 at the forward end 30 and second side 36 of the implement 10. A third contact sensor 60C and/or a third non-contact sensor 62C may be provided in association with the third disc gang assembly 44C in order to capture data indicative of the material flow past the disc blade(s) 46 at the aft end 32 and first side 34 of the implement 10. A fourth contact sensor 60D and/or non-contact sensor 62D may be provided in association with the fourth disc gang assembly 44D in order to capture data indicative of the material flow past the disc blade(s) 46 at the aft end 32 and second side 36 of the implement 10.

Furthermore, as illustrated in FIG. 6, one or more non-contact sensors 62 may be coupled to the work vehicle 12 in order to capture data indicative of the material flow past the disc blades 46 of one or more of the disc gang assemblies 44. For example, a fifth non-contact sensor 62E may be coupled to the work vehicle 12, such as to the chassis 20 of the work vehicle 12, and oriented toward the first side 34 of the implement 10. As such, the fifth non-contact sensor 62E may be configured to capture data indication of the material flow past the disc blade(s) 46 of the first disc gang assembly 44A and/or the third disc gang assembly 44C. Similarly, a sixth non-contact sensor 62F may be coupled to the work vehicle 12, such as to the chassis 20 of the work vehicle 12, and oriented toward the second side 36 of the implement 10. As such, the sixth non-contact sensor 62F may be configured to capture data indication of the material flow past the disc blade(s) 46 of the second disc gang assembly 44B and/or the fourth disc gang assembly 44D. As another example, a seventh non-contact sensor 62G may be coupled to the work vehicle 12, such as to the cab 22 of the work vehicle 12, and oriented toward one or more of the disc gang assemblies 44 of the implement 10. As such, in the illustrated embodiment, the seventh non-contact sensor 62G may be configured to capture data indication of the material flow past the disc blade(s) 46 of the first disc gang assembly 44A, the second disc gang assembly 44B, the third disc gang assembly 44C, and/or the fourth disc gang assembly 44D. It should be appreciated that the difference in height between the implement 10 and the work vehicle 12 may generally allow non-contact sensors 62 coupled to the work vehicle 12 to capture data indicative of the material flow past multiple disc gang assemblies 44.

One of ordinary skill in the art will readily appreciate that the implement 10 and/or work vehicle 12 described need not include each of the contact sensors 60 and non-contact sensors 62 shown in FIG. 6. For instance, embodiments of the implement 10 and/or work vehicle 12 may only include one of the contact sensors 60 and/or non-contact sensors 62 shown in FIG. 6. It should be appreciated that, in alternative embodiments, the additional or alternative sensors may be provided and configured as any other suitable device for sensing or detecting a parameter indicative of the material flow past the disc blade(s) 46 of one or more of the disc gang assemblies 44. It should be appreciated that although the contact sensors 60 and non-contact sensors 62 have been described in the context of a ganged tool assembly, one or more contact sensors 60 and/or non-contact sensors 62 may, for example, be provided in operative association with the ground engaging tool of a tool assembly or individual ground engaging tool to allow the material flow past the associated the ground engaging tool to be monitored.

Referring now to FIG. 7, a schematic view of one embodiment of a system 100 for monitoring and/or controlling the operation of one or more tool assemblies, ganged tool assemblies, and/or individual tools of a tillage implement is illustrated in accordance with aspects of the present subject matter. More particularly, the system 100 may further generally detect the levelness of ground engaging tools of a tillage implement, such as one or more ground engaging tools of a tillage implement and/or associated tool assemblies. In general, the system 100 will be described herein with reference to the implement 10, disc gang assemblies 44, and disc blades 46 described above with reference to FIGS. 1-6. However, it should be appreciated by those of ordinary skill in the art that the disclosed system 100 may generally be utilized with tillage implements having any other suitable implement configuration as well as ganged tool assemblies, tool assemblies, and/or ground engaging tools having any other suitable configuration. Further, though described in reference to a ganged tool assemblies, it should be appreciated the following disclosure is generally applicable to a tool assemblies each including a single ground engaging tool coupled to the frame 28 of the agricultural implement 10 or individual tools coupled to the frame 28.

As shown in FIG. 7, the system 100 may include one or more components of the tillage implement 10 and/or the disc gang assembly 44. As shown, the system 100 may generally include a controller 128 configured to be communicatively coupled to a plurality of sensors 60, 62, 68, 71 for monitoring one or more operating parameters associated with the implement 10. For example, in several embodiments, the system 100 may include one or more sensors configured to capture data indicative of one or more operational parameters of disc gang assembly 44 and/or disc blades 46, such as the contact sensor(s) 60 and/or non-contact sensor(s) 62 described above with reference to FIGS. 4-6. However, it should be appreciated that, in alternative embodiments, the system 100 may include any other suitable components of the implement 10 and/or disc gang assembly 44, such as the gang actuator(s) 104.

In accordance with aspects of the present subject matter, the system 100 may include the controller 128 configured to electronically control the operation of one or more components of the implement 10. For instance, in response to an input indicating the implement 10 is in a cultivating state, the controller 128 may be configured to lower various ground engaging tools of the tillage implement 10, such as the disc blades 46, shanks 50, leveling blades 52, and/or basket assemblies 54, and raise such ground engaging tools in response to an input indicating the implement 10 is in a traveling state. In general, the controller 128 may comprise any suitable processor-based device known in the art, such as a computing device or any suitable combination of computing devices. Thus, in several embodiments, the controller 128 may include one or more processor(s) 130 and associated memory device(s) 132 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 132 of the controller 128 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 132 may generally be configured to store suitable computer-readable instructions that, when implemented by the processor(s) 130, configure the controller 128 to perform various computer-implemented functions, such as one or more aspects of the method 200 described below with reference to FIG. 8. In addition, the controller 128 may also include various other suitable components, such as a communications circuit or module, one or more input/output channels, a data/control bus and/or the like.

It should be appreciated that the controller 128 may correspond to an existing controller of the implement 10 or an associated work vehicle (not shown) or the controller 128 may correspond to a separate processing device. For instance, in one embodiment, the controller 128 may form all or part of a separate plug-in module that may be installed within the implement 10 or associated work vehicle 12 to allow for the disclosed system 100 and method 200 to be implemented without requiring additional software to be uploaded onto existing control devices of the implement 10 or the associated work vehicle 12.

Furthermore, in one embodiment, the system 100 may also include a user interface 102. More specifically, the user interface 102 may be configured to provide feedback (e.g., notifications associated with the operational parameters of the disc gang assembly 44 and/or the disc blades 46) to the operator of the implement 10. As such, the user interface 102 may include one or more feedback devices (not shown), such as display screens, speakers, warning lights, and/or the like, which are configured to communicate such feedback. In addition, some embodiments of the user interface 102 may include one or more input devices (not shown), such as touchscreens, keypads, touchpads, knobs, buttons, sliders, switches, mice, microphones, and/or the like, which are configured to receive user inputs from the operator. In one embodiment, the user interface 102 may be positioned within a cab 22 of the work vehicle 12 configured to tow the implement 10 across the field. However, in alternative embodiments, the user interface 102 may have any suitable configuration and/or be positioned in any other suitable location.

In several embodiments, the controller 128 may be configured to monitor one or more operational parameters of the disc gang assembly 44 and/or the associated ground engaging tools of the disc gang assembly (e.g. the disc blades 46) as the implement 10 is being moved across the field. Specifically, in one embodiment, the controller 128 may be communicatively coupled to the contact sensor(s) 60 and/or non-contact sensor(s) 62 associated with the disc blades 46 of one or more disc gang assemblies 44 via a wired or wireless connection to allow operational parameter data (e.g., as indicated by dashed lines 136 in FIG. 7) to be transmitted from the contact sensor(s) 60 and/or non-contact sensor(s) 62 to the controller 128. As such, the controller 128 may be configured to determine or estimate the material flow past the disc blade(s) 46 as the disc blades 46 are being pulled through the ground based on the data 136 received from the contact sensor(s) 60 and/or non-contact sensor(s) 62. For instance, the controller 128 may include a look-up table, suitable mathematical formula, and/or algorithms stored within its memory 132 that correlates the sensor data 136 to the material flow past the disc blade(s) 46. In one embodiment, the controller 128 may be configured to estimate the material flow past the disc blade(s) 46 of distinct disc gang assemblies 44. For instance, the controller may determine or estimate the material flow past the disc blade(s) 46 of the first, second, third, and/or fourth disc gang assemblies 44A, 44B, 44C, 44D utilizing data 136 received from first, second, third, fourth, fifth, sixth, and/or seventh sensors 60A, 62A, 60B, 62B, 60C, 62C, 60D, 62D, 62E, 62F, 62G, respectively.

Furthermore, as explained in reference to FIG. 6, one or more of the sensors (e.g., non-contact sensors 62E, 62F, 62G) may be configured to communicate sensor data 136 indicative of the material flow past the disc blade(s) 46 of multiple disc gang assemblies 44. As such, the controller 128 may be configured to process the data and distinguish the data associated with the respective disc gang assemblies 44. Moreover, the controller 128 may be configured to determine or estimate the material flow past the disc blade(s) 46 of distinct disc gang assemblies 44 based on the data associated with the material flow past multiple disc gang assemblies 44.

Generally, by monitoring the data 136 associated with material flow past the disc blade(s) 46 of two or more disc gang assemblies 44, the controller 128 may be able to determine the levelness of the disc blades 46 between the disc gang assemblies 44. Specifically, during operation of the implement 10, the disc gang assembly 44 (e.g., the disc blades 46) may push foreign substances, such as debris and clods, out of the direction of travel 14 of each disc gang assembly 44 while simultaneously cultivating the soil. In doing so, the disc blades 46 may lift and throw the lifted soil 70 as the disc blades 46 cultivate the soil and move such foreign substance out of the direction of travel of each disc gang assembly 44. However, due to inconsistencies in the surface of the field to be cultivated or incorrectly positioned disc blades 46 and/or disc gang assemblies 46, a portion of the disc blades 46 may not be level in relation to the surface of the soil to be cultivated. For example, the disc blades 46 may not be level to the ground such that the implement is essentially parallel to the ground. As such, disc blades 46 that penetrate the soil to a greater degree may throw a larger quantity of lifted soil 70. Contrarily, disc blades 46 that penetrate the soil to a lesser degree may throw a smaller quantity of lifted soil 70. As such, by monitoring and comparing the material flow past the disc blade(s) 46 of separate disc gang assemblies 44, unlevel disc blades 46 may be inferred based on the difference in the material flow past the disc blade(s) 46, e.g., when the material flow differs by at least a predetermined threshold value for a predetermined length of time.

Accordingly, as one example, the controller 128 may be configured to monitor the sensor data 136 received from one or more of the sensors 60A, 62A, 60B, 62B, 60C, 62C, 60D, 62D, 62E, 62F, 62G. Further, the controller 128 may be configured to compare one or more monitored values on the first side 34 of the implement 10 (e.g., the material flow past the disc blade(s) 46 of the first disc gang assembly 44A or third disc gang assembly 44C) to one or more monitored values on the second side 36 of the implement 10 (e.g., the material flow past the disc blade(s) 46 of the second disc gang assembly 44B or fourth disc gang assembly 44D). As such, the system 10 may determine that at least a portion of the disc blades 46 are not level relative to the ground between the first side 34 of the implement 10 and the second side 36 of the implement 10. For example, the predetermined threshold value may be selected as the maximum difference in the material flow past the disc blade(s) 46 between disc gang assemblies 44 indicating that the disc blades 46 are level in relation to one another or approximately level in relation to one another (e.g., are penetrating the soil to the same or substantially same degree and thus experience approximately the same material flow past the disc blade(s) 46). In such instance, the controller 128 may be configured to identify that at least a portion of the disc blades 46 are not level relative to the ground between the first side 34 and the second side 36 of the implement 10 when a difference between a first monitored value from the first, third, fifth, and/or seventh sensors 60A, 62A, 60C, 62C, 62E, 62G and a second monitored value from the second, fourth, sixth, and/or seventh sensors 60B, 62B, 60D, 62D, 62F, 62G exceeds the predetermined threshold value and stays there for the predetermined length of time.

As another example, the controller 128 may be configured to compare one or more monitored values at the forward end 30 of the implement 10 (e.g., the material flow past the disc blade(s) 46 of the first disc gang assembly 44A or second disc gang assembly 44B) to one or more monitored values at the aft end 32 of the implement 10 (e.g., the material flow past the disc blade(s) 46 of the third disc gang assembly 44C or/or fourth disc gang assembly 44D). As such, the system 100 may determine that at least a portion of the disc blades 46 are not level relative to the ground and a forward direction of travel 14 of the implement 10. For example, the predetermined threshold value may be selected as the maximum difference in the material flow past the disc blade(s) 46 between disc gang assemblies 44 indicating that the disc blades 46 are level in relation to one another or approximately level in relation to one another (e.g., are penetrating the soil to the same or substantially same degree and thus experience approximately the same material flow past the disc blade(s) 46). In such instance, the controller 128 may be configured to identify that at least a portion of the disc blades 46 are not level relative to the ground and the forward direction of travel 14 of the implement 10 when a difference between a first monitored value from the first, second, fifth, sixth, and/or seventh sensors 60A, 62A, 60B, 62B, 62E, 62F, 62G and a second monitored value from the third, fourth, fifth, sixth, and/or seventh sensors 60C, 62C, 60D, 62D, 62E, 62F, 62G exceeds the predetermined threshold value and stays there for the predetermined length of time.

It should be appreciated that the predetermined threshold value may be determined by the characteristics of the particular ganged tool assemblies 44, disc blades 46, and/or other ground engaging tools. For instance, the predetermined threshold value may be affected by the length of the disc gang shaft 46, the number of disc blades 46, the angle of attack of the disc blades 46, the camber angle of the disc blades 46, the size of the disc blades 46, the concavity of the disc blades 46, length or width or depth of the disc blades 46, and/or the difference in any of these characteristics between gang tool assemblies 44. However, it should be appreciated that one skilled in the art can contemplate other characteristics of the disc gang assemblies 44 that may affect the predetermine threshold value.

As a further example, the controller 128 may be configured to compare between one or more monitored values associated with the first side 34 and the forward end 30 of the implement 10 (e.g., the material flow past the disc blade(s) 46 of the first disc gang assembly 44A), one or more monitored values associated with the second side 36 and the forward end 30 of the implement 10 (e.g., the material flow past the disc blade(s) 46 of the second disc gang assembly 44B), one or more monitored values associated with the first side 34 and the aft end 32 of the implement 10 (e.g., the material flow past the disc blade(s) 46 of the third disc gang assembly 44C), and one or more monitored values associated with the second side 36 and the aft end 32 of the implement 10 (e.g., the material flow past the disc blade(s) 46 of the fourth disc gang assembly 44D). As such, the system 100 may simultaneously determine that at least a portion of the disc blades 46 are not level relative to the ground between the first side 34 of the implement 10, the second side 36 of the implement 10, the forward end 30 of the implement 10, and the aft end 32 of the implement 10 by comparing the difference between the material flow past the disc blade(s) 46 between disc blade assemblies 44 as described generally above. Specifically, by comparing the material flow past the disc blade(s) 46 at the four corners of the implement 10, the controller 128 may be able to determine the levelness of all of the disc blades 46.

Though the above determination is based on the comparison of the material flow past the disc blade(s) 46 of four disc gang assemblies 44, it is contemplated such comparison may be utilized with any desirable number of disc blades 46 and associated disc gang assemblies 44. For instance, the monitored material flow past the disc blade(s) 46 may be compared to monitored material flow past the additional disc blade(s) 46 and/or disc gang assemblies 44 to determine whether the disc blades 46 are level.

Furthermore, the controller 128 may be configured to initiate one or more control actions when the controller 128 determines that a portion of the disc blades 46 are not level. For example, the controller 128 may be configured to notify the operator of the implement 10 that at least a portion of the disc blades 46 are not level. Specifically, in one embodiment, the controller 128 may be communicatively coupled to the user interface 102 via a wired or wireless connection to allow feedback signals (e.g., indicated by dashed line 138 in FIG. 4) to be transmitted from the controller 128 to the user interface 102. In such an embodiment, the feedback signals 138 may instruct the user interface 102 to provide a notification to the operator of the implement 10 (e.g., by causing a visual or audible notification or indicator to be presented to the operator) that provides an indication that a portion of the disc blades 46 are not level. In such instances, the operator may then choose to initiate any suitable corrective action he/she believes is necessary, such as adjusting the downforce applied to the disc gang assembly 44 and/or adjusting the position of the disc blade(s) 46. For example, the operator may adjust the actuator 104 of one or more of the disc gang assemblies 44 by retracting the rod 106. As such, the disc blades 46 may rise relative to the ground surface in order to level out the disc blades 46. Contrarily, the operator may adjust the actuator 104 of one or more of the disc gang assemblies 44 by extending the rod 106. As such, the disc blades 46 may lower relative to the ground surface in order to level out the disc blades 46. Additionally, a down force applied to the disc gang assembly 44 may be reduced to allow a draft load force to raise the disc blades 46. On the other hand, a down force to the disc gang assembly 44 may be increased in order in increase the depth of the disc blades 46 within the soil. Additionally, as described below, the controller 128 may be configured to actively control the disc gang assembly(ies) 44 when it is determined that one or more disc blades 46 are not level.

In accordance with aspects of the present subject matter, the controller 128 may be configured to control the operation of the disc gang assembly 44 and/or disc blades 46 based on the monitored operational parameter(s) deriving from the sensor data 136. Specifically, as shown in FIG. 7, the controller 128 may be communicatively coupled to one or more components of the disc gang assembly 44, such as the gang actuator 104, via a wired or wireless connection to allow control signals (e.g., indicated by dashed lines 146 in FIG. 7) to be transmitted from the controller 128 to the actuator 104. As such, the controller 128 may be configured to transmit control signals 146 to actuator 104 or associated components instructing the actuator 104 to adjust the downforce being applied to the disc gang assembly 44 and/or disc blades 46, such as by extending or retracting the actuator's rod 106 relative to the corresponding cylinder 108. For example, when it is determined that one or more of the disc blades 46 are not level (e.g., when the difference between the monitored material flow past the disc blade(s) 46 of the disc gang assemblies 44 rises above the predetermined load threshold) the controller 128 may be configured to transmit control signals 146 to the actuator 104 instructing the actuator 104 to raise or lower the disc gang assembly(ies) 44, and thus the disc blades 46 and/or reduce the downforce being applied to the disc blades 46 in order to level out the disc blades 46.

In an additional or alternative embodiment, the controller 128 may be configured to determine the effectiveness of the cultivation process based on the difference between one or more monitored values associated with the material flow past the disc blade(s) 46 between separate disc gang assemblies 44. Generally, a level implement 10 will be more efficient than an implement 10 that is not level relative to the ground. Specifically, an implement 10 with disc blades 46 that are level or approximately level will cultivate the soil to a similar degree within the entire path or approximately the entire path of the implement 10 relative to the forward direction of travel 14. As such, the specific correlation between the difference in the monitored material flow past the disc blade(s) 46 for the separate disc gang assemblies 44 may, for example, be determined experimentally and/or mathematically and subsequently expressed as a mathematical expression, a look-up table, and/or the like. For instance, a look-up table may be developed that correlates the magnitude of the difference in material flow data between the disc blade(s) 46 of disc gang assemblies 44. In addition, a suitable data fusion or sensor fusion algorithm may be utilized to analyze the data received from the sensors 60, 62 with the output of such algorithm being used to estimate or determine the effectiveness of the cultivation process.

In at least one embodiment, the controller 128 may be configured to determine the compaction of the soil and/or other field condition of the soil being cultivated based on the one or more monitored values associated with the material flow past the disc blade(s) 46 of one or more disc gang assemblies 44. For instance, larger density or height of the thrown soil 70 may indicate more compact soil such that it may be desirable to decrease the speed of the work vehicle 10 and/or decrease the depth of the ground engaging tools. Additionally, in several embodiments, the correlation established between the one or more monitored values associated with the material flow past the disc blade(s) 46 of one or more disc gang assemblies 44 and the soil compaction or other field condition being monitored may also take into account the speed at which the implement 10 is being moved across the field. For instance, for a given soil compaction, the magnitude of the material flow past the disc blade(s) 46 may van based on the ground speed of the implement 10. As an example, the disc blades 46 of the implement 10 may experience higher material flow while the implement 10 is being moved across the field at 6 miles-per-hour (MPH) than when the implement 10 is being moved across the field at 4 MPH despite the disc blades 46 being exposed to the exact same field condition. In this regard, the controller 128 may also be coupled to a suitable speed sensor, such as the speed sensor(s) 71 described above with reference to FIGS. 1 and 2, to allow the controller 128 to monitor the ground speed of the implement 10. This speed data may then be used when interpreting the data indicative of the one or more monitored values associated with the material flow past the disc blade(s) 46 of one or more disc gang assemblies 44 received from the sensors 60, 62. For instance, in one embodiment, separate mathematical expressions or look-up tables may be established for correlating the material flow data to the soil compaction and/or field condition at differing ground speeds, such as by establishing a separate mathematical expression or look-up table for each of a plurality of incremental ground speeds (e.g., at each speed defined between 0 MPH and 10 MPH in increments of 0.1 MPH).

Further, in certain embodiments, the correlation between differences in material flow data between disc gang assemblies 44 and the efficiency of the cultivation process and/or the field condition may be stored for one or more locations as the implement 10 is being moved across the field. For example, location data may be associated with each combination of differences in material flow data between disc blades 46 between disc gang assemblies 44, the magnitude of such material flow data, the efficiency of the cultivation process, or the field condition. Further, such data or combination of data may be stored within the memory device(s) 132. In this regard, the controller 128 may also be coupled to a suitable location sensor, such as the location sensor(s) 68 described above in regards to FIGS. 1 and 2, to allow the controller 128 to store the data from the sensor(s) 60, 62, 70, 71, the levelness of the disc blades 46, the efficiency of the cultivation process, the soil compaction, and/or the field condition for one or more locations within the field, such as for each location within the field. Further, the location data from the location sensor(s) 68 may allow for the creation of a field map with geographical coordinates illustrating the levelness of the disc blades 46, the efficiency of the cultivation process, the soil compaction, and/or the field condition at one or more locations within the field. In one exemplary embodiment, the controller 128 may be configured to communicate such data (e.g., the progression of the cultivation process, the levelness of the disc blades 46, the efficiency of the cultivation process, the soil compaction, and/or the field condition) to a remote supervisor utilizing a wireless communication bus, wireless network, or similar method of communicating to a remote supervisor.

Figure 8:
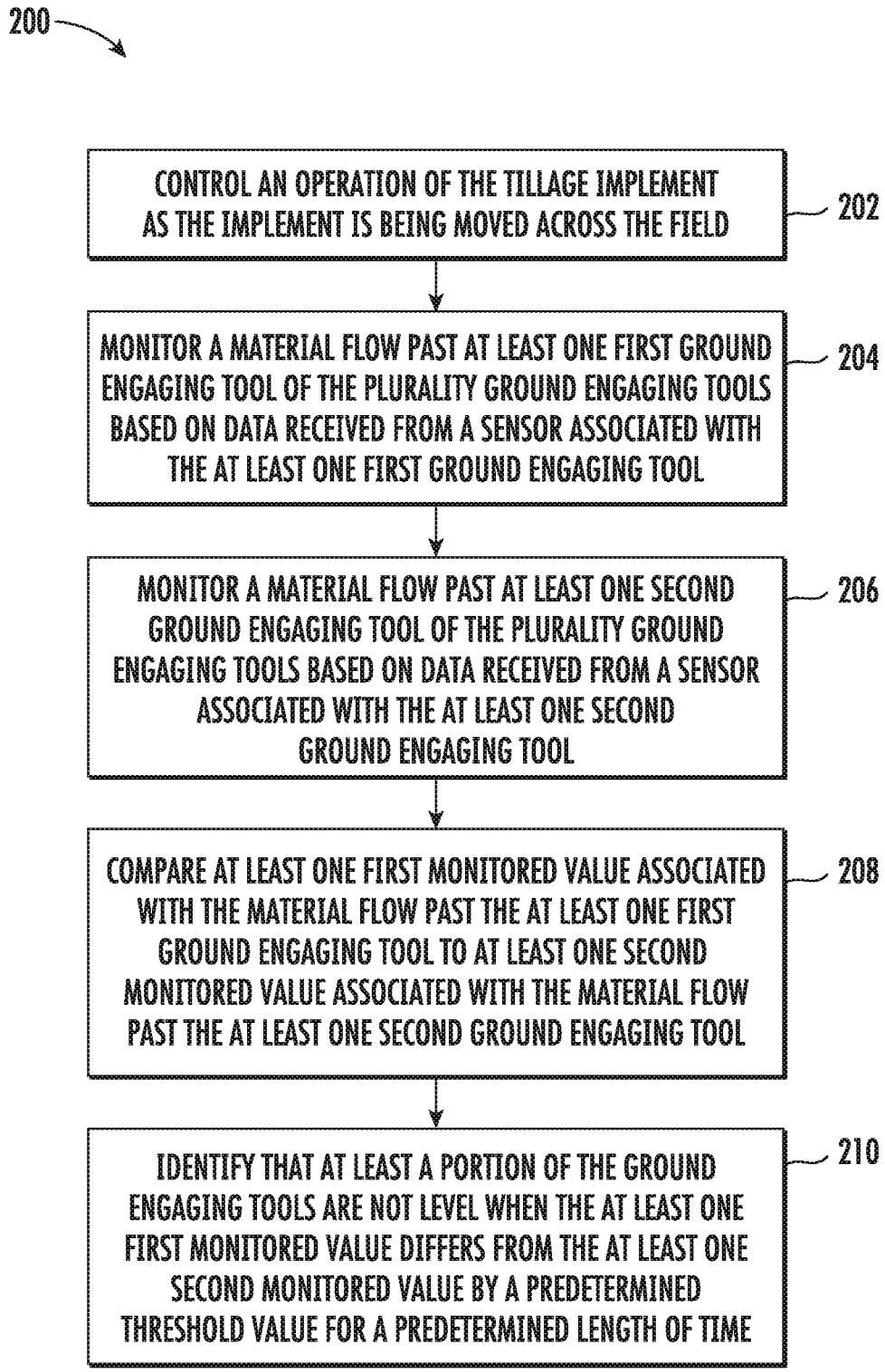
FIG. 8 illustrates a flow diagram of one embodiment of a method for detecting the levelness of ground engaging tools of a tillage implement in accordance with aspects of the present subject matter.

Referring now to FIG. 8, a flow diagram of one embodiment of a method 200 for detecting the levelness of ground engaging tools of a tillage implement is illustrated in accordance with aspects of the present subject matter. For example, the method 200 may detect whether the ground engaging tools are level relative to the ground the tillage implement travels over such that the tillage implement is essentially parallel to the ground. In general, the method 200 will be described herein with reference to the tillage implement 10 and the system 100 described above with reference to FIGS. 1-7. However, it should be appreciated by those of ordinary skill in the art that the disclosed method 200 may generally be utilized to detect the levelness of ground engaging tools of any tillage implement including one or more ganged tool assemblies and/or tool assemblies and associated ground engaging tools or individual ground engaging tools having any suitable implement configuration and/or in connection with any system having any suitable system configuration. In addition, although FIG. 8 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 8, at (202), the method 200 may include controlling an operation of a tillage implement as the implement is being moved across the field. For instance, as described above, the controller 128 may be configured to control the operation of one or more components of the tillage implement 10 as the implement 10 is being moved across the field.

Additionally, at (204), the method 200 may include monitoring a material flow past one or more first ground engaging tools based on data received from a sensor associated with first ground engaging tool(s). For instance, as described above, the controller 128 may be communicatively coupled to one or more sensors, such as a contact sensor(s) 60 and/or non-contact sensor(s) 62, which are configured to capture data 136 indicative of a material flow past one or more disc blades 46. As such, the controller 128 may be configured to monitor the material flow past the disc blade(s) 46 based on the sensor data 136 received from the contact sensor(s) 60 and/or non-contact sensor(s) 62.

At (206), the method 200 may include monitoring a material flow past one or more second ground engaging tools based on data received from a sensor associated with one or more second ground engaging tools. For instance, as described above, the controller 128 may be communicatively coupled to one or more sensors, such as a contact sensor(s) 60 and/or non-contact sensor(s) 62, which are configured to capture data 136 indicative of a material flow past one or more disc blades 46. As such, the controller 128 may be configured to monitor the material flow past the disc blade(s) 46 based on the sensor data 136 received from the contact sensor(s) 60 and/or non-contact sensor(s) 62.

As an example, the first sensor 60, 62 may be positioned at and/or oriented toward the first side 34 of the implement 10 (e.g., sensor(s) 60A, 62A, 60C, 62C, 62E, 62G), and the second sensor 60, 62 may be positioned at and/or oriented toward the second side 36 of the implement 10 (e.g. sensor(s) 60B. 62B, 60D, 62D. 62F 62G). As another example, the first sensor 60, 62 may be positioned at and/or oriented toward the forward end 30 of the implement 10 (e.g., sensor(s) 60A, 62A, 60B, 62B, 62E, 62F, 62G), and the second sensor 60, 62 may be positioned at and/or oriented toward the aft end 32 of the implement 10 (e.g. sensor(s) 60C, 62C, 60D, 62D, 62E, 62F, 62G). Furthermore, the sensor data 136 may include sensor data indicative of a height 69 and/or density of thrown soil 70 by one or more of the disc blades 46.

Additionally, at (208), the method 200 may include comparing one or more first monitored values associated with the material flow past the first ground engaging tool(s) to one or more second monitored values associated with the material flow past the second ground engaging tool(s). For example, as described above, the controller 128 may be configured to monitor the material flow past the disc blade(s) 46 of the first gang disc assembly 44 based on data 136 received from the sensor(s) 60, 62 associated with the first gang disc assembly 44 and monitor the material flow past the disc blade(s) 46 of the second gang disc assembly 44 based on data 136 received from the sensor(s) 60, 62 associated with the second disc gang assembly 44. As such, the controller 128 may compare the material flow past the disc blade(s) 46 of the first gang disc assembly 44 to the material flow past the disc blade(s) 46 of the second gang disc assembly 44.

Furthermore, at (210), the method 200 may include identifying that at least a portion of the ground engaging tools are not level when the first monitored value(s) differs from the second monitored value(s) by a predetermined threshold value for a predetermined length of time. In one instance, as described above, the controller 128 may be configured to identify that at least a portion of the disc blades 46 are not level when the difference in material flow past the disc blade(s) 46 exceeds the predetermined threshold value for a predetermined length of time.

Moreover, the method 200 may, for example, include initiating a control action when an occurrence of unlevel ground engaging tools is detected. For example, as described above, when disc blades 46 that are not level are identified, the controller 128 may be configured to notify an operator of the tillage implement 10, automatically adjust a position of the disc blade(s) 46 relative to a ground surface across which the tillage implement 10 is being moved, and/or adjust a downforce being applied to the disc blade(s) 46. Specifically, as described above, the controller 128 may be configured to transmit control signals 138 to the user interface 102 and/or transmit control signals 146 to the gang actuator(s) 104 to adjust one or more operating parameters of the disc blade(s) 46, such as the position of the disc blade(s) 46 and/or the downforce being applied thereto, based on the levelness of the disc blades 46. Further, the method 200 may include determining at least one condition of the soil of the field, such as soil compaction, based on the material flow data associated with the disc blades 46.

It is to be understood that the steps of the method 200 are performed by the controller 128 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 128 described herein, such as the method 200, is implemented in software code or instructions which are tangibly stored on a tangible computer readable medium. The controller 128 loads the software code or instructions via a direct interface with the computer readable medium or via a wired and/or wireless network. Upon loading and executing such software code or instructions by the controller 128, the controller 128 may perform any of the functionality of the controller 128 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for detecting the levelness of disc blades of a tillage implement, the system comprising:
   an agricultural implement including a frame and a plurality of disc blades supported relative to the frame;
   a first sensor coupled to the frame, the first sensor configured to capture data indicative of a material flow past at least one first disc blade of the plurality of disc blades;
   a second sensor coupled to the frame, the second sensor configured to capture data indicative of a material flow past at least one second disc blade of the plurality of disc blades; and
   a controller configured to monitor data received from the first sensor and the second sensor and compare at least one first monitored value associated with the material flow past the at least one first disc blade to at least one second monitored value associated with the material flow past the at least one second disc blade, the controller being configured to identify that at least a portion of the disc blades are not level when the at least one first monitored value differs from the at least one second monitored value by a predetermined threshold value.

2. The system of claim 1, wherein at least one of the first sensor or second sensor comprises a non-contact sensor.

3. The system of claim 2, wherein the non-contact sensor comprises a camera, optical sensor, RADAR sensor, ultrasonic transceiver, or motion detector.

4. The system of claim 1, wherein at least one of the first sensor or second sensor comprises a contact sensor.

5. The system of claim 1, further comprising:
   a first ganged tool assembly, the first ganged tool assembly including a toolbar coupled to the frame and a plurality of the first disc blades coupled to the toolbar; and
   a second ganged tool assembly, the second ganged tool assembly including a toolbar coupled to the frame and a plurality of the second disc blades coupled to the toolbar.

6. The system of claim 5, wherein at least one of the first sensor or second sensor is coupled to the toolbar of the first ganged tool assembly or second ganged tool assembly, respectively.

7. The system of claim 1, wherein the captured data from the first sensor and the second sensor is indicative of the material flow at a location aft of the at least one first disc blade and the at least one second disc blade, respectively, relative to a direction of travel of the agricultural implement.

8. The system of claim 1, wherein at least one of the first sensor or the second sensor is configured to capture data indicative of a height or density of soil lifted by the at least one first disc blade or the at least one second disc blade, respectively.

9. The system of claim 1, wherein the at least one first disc blade is located at a first side of the implement, and the at least one second disc blade is located at a second side of the implement opposite the first side, wherein the controller is configured to identify that the at least portion of the disc blades are not level between the first side and second side of the implement.

10. The system of claim 1, wherein the at least one first disc blade is located at a forward end of the implement, and the at least one second disc blade is located at an aft end of the implement, wherein the controller is configured to identify that the at least portion of the disc blades are not level relative to a forward direction of travel of the implement.

11. The system of claim 9, wherein the at least one first disc blade and the at least one second disc blade are each further located at a forward end of the implement, the system further comprising:
   a third sensor coupled to the frame, the third sensor configured to capture data indicative of a material flow past at least one third disc blade of the plurality of disc blades, wherein the at least one third disc blade is located at an aft end of the implement and at the first side of the implement; and a fourth sensor coupled to the frame, the fourth sensor configured to capture data indicative of a material flow past at least one fourth disc blade of the plurality of disc blades, wherein the at least one fourth disc blade is located at an aft end of the implement and at the second side of the implement; and wherein the controller is further configured to monitor data received from the third sensor and the fourth sensor and identify that the at least portion of the disc blades are not level relative to the forward direction of travel of the implement.

12. The system of claim 1, wherein the controller is further configured to initiate a control action when the controller identifies that the at least portion of the disc blades are not level, wherein the control action comprises at least one of notifying an operator of the tillage implement that the at least portion of the disc blades are not level, adjusting a position of the at least portion of the disc blades relative to a ground surface, or adjusting a downforce being applied to the at least portion of the disc blades ground-engaging-tools.

13. A method for detecting the levelness of disc blades of a tillage implement, the implement including an implement frame and a plurality of disc blades supported relative to the frame, the method comprising:

controlling, with a computing device, an operation of the tillage implement as the implement is being moved across the field;

monitoring, with the computing device, a material flow past at least one first disc blade of the plurality of disc blades based on data received from a sensor associated with the at least one first disc blade;

monitoring, with the computing device, a material flow past at least one second disc blade of the plurality of disc blades based on data received from a sensor associated with the at least one second disc blade;

comparing at least one first monitored value associated with the material flow past the at least one first disc blade to at least one second monitored value associated with the material flow past the at least one second disc blade; and identifying that at least a portion of the disc blades are not level when the at least one first monitored value differs from the at least one second monitored value by a predetermined threshold value for a predetermined length of time.

14. The method of claim 13, wherein at least one of the sensors associated with the at least one first disc blade or the at least one second disc blade is configured to capture data indicative of a height or density of soil lifted by the at least one first disc blade or the at least one second disc blade, respectively.

15. The method of claim 13, wherein the at least one first disc blade is located at a first side of the implement, the at least one second disc blade is located at a second side of the implement opposite the first side, wherein identifying that the at least portion of the disc blades are not level comprises determining that the at least portion of the disc blades are not level between the first side and second side of the implement when a difference between the first monitored value and the second monitored value exceeds the predetermined load threshold.

16. The method of claim 13, wherein the at least one first disc blade is located at a forward end of the implement, the at least one second disc blade is located at an aft end of the implement, and wherein identifying that the at least portion of the disc blades are not level comprises determining that the at least portion of the disc blades are not level relative to a forward direction of travel of the implement when a difference between the first monitored value and the second monitored value exceeds the predetermined load threshold.

17. The method of claim 13, further comprising:
initiating, with the computing device, a control action when the at least one first monitored value differs from the at least one second monitored value by the predetermined threshold value for the predetermined length of time, the control action comprising at least one of notifying an operator of the tillage implement that the at least portion of the disc blades are not level, adjusting a position of the at least portion of the disc blades relative to a ground surface, or adjusting a downforce being applied to the at least portion of the disc blades.

18. A tillage system, the tillage system comprising:
a work vehicle configured to move across a field;
an agricultural implement coupled to the work vehicle, the agricultural implement including a frame and a plurality of disc blades supported relative to the frame; and
a system for detecting the levelness of at least a portion of the plurality of disc blades, the system comprising,
at least one sensor coupled to at least one of the frame or the work vehicle, the at least one sensor configured to capture data indicative of a material flow past at least one first disc blade and at least one second disc blade of the plurality of disc blades; and
a controller configured to monitor data received from the at least one sensor and compare at least one first monitored value associated with the material flow past the at least one first disc blade to at least one second monitored value associated with the material flow past the at least one second disc blade, the controller being configured to identify that the at least a portion of the disc blades are not level when the at least one first monitored value differs from the at least one second monitored value by a predetermined threshold value.

19. The tillage system of claim 18, wherein the at least one sensor comprises a first sensor coupled to the work vehicle, the first sensor configured to capture data indicative of the material flow past the at least one first disc blade, and a second sensor coupled to the work vehicle, the second sensor configured to capture data indicative of the material flow past the at least one second disc blade.

20. The tillage system of claim 18, wherein the at least one sensor comprises a sensor coupled to the work vehicle, the sensor configured to capture data indicative of the material flow past the at least one first disc blade and the at least one second disc blade, wherein the controller is further configured to the monitor data received from the sensor and determine the first monitored value associated with the material flow past the at least one first disc blade and determine the second monitored value associated with the material flow past the at least one second disc blade based on the data received the sensor.

21. The method of claim 13, wherein the data received from the sensor associated with the at least one first disc blade and the sensor associated with the at least one second disc blade is indicative of the material flow at a location aft of the at least one first disc blade and the at least one second disc blade, respectively, relative to a direction of travel of the tillage implement.

22. The system of claim 18, wherein the captured data from the at least one sensor is indicative of the material flow at a location aft of the at least one first disc blade and the at least one second disc blade relative to a direction of travel of the agricultural implement.

* * * * *